US006581958B2

(12) United States Patent
Holtz

(10) Patent No.: US 6,581,958 B2
(45) Date of Patent: Jun. 24, 2003

(54) ENERGY MANAGED AIRBAG COVER

(75) Inventor: Kimberlee D. Holtz, Grand Blanc, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/836,897

(22) Filed: Apr. 17, 2001

(65) Prior Publication Data
US 2002/0149179 A1 Oct. 17, 2002

(51) Int. Cl.[7] ............................ B60R 21/20; B60R 21/16
(52) U.S. Cl. ............................ 280/728.3; 280/732
(58) Field of Search ............................ 280/728.3, 732, 280/728.2, 731

(56) References Cited

U.S. PATENT DOCUMENTS

| 5,284,358 | A | * | 2/1994 | Rhein ................ 280/728.2 |
| 5,297,813 | A | * | 3/1994 | Baba et al. ............ 280/728.3 |
| 5,303,951 | A | * | 4/1994 | Goestenkors et al. ..... 280/732 |
| 5,342,090 | A | * | 8/1994 | Sobczak et al. ......... 280/728.3 |
| 5,346,248 | A | * | 9/1994 | Rhein et al. ............ 280/732 |
| 5,358,271 | A | * | 10/1994 | Watanabe et al. ........ 280/728.3 |
| 5,362,096 | A | * | 11/1994 | Satoh et al. ............ 280/732 |
| 5,374,079 | A | * | 12/1994 | Dukeshire et al. ....... 280/728.3 |
| 5,439,246 | A | * | 8/1995 | Ravenberg et al. ....... 280/728.3 |
| 5,456,487 | A | * | 10/1995 | Daris et al. ............ 280/728.3 |
| 5,466,000 | A | | 11/1995 | Leonard et al. |
| 5,499,841 | A | * | 3/1996 | Trojan et al. ............ 200/61.54 |
| 5,511,821 | A | | 4/1996 | Meyer et al. |
| 5,533,748 | A | | 7/1996 | Wirt et al. |
| 5,533,749 | A | | 7/1996 | Leonard et al. |
| 5,556,126 | A | * | 9/1996 | Lee ................ 280/728.3 |
| 5,566,975 | A | | 10/1996 | Stull et al. |
| 5,585,606 | A | | 12/1996 | Ricks |
| 5,613,700 | A | * | 3/1997 | Hiramitsu et al. ........ 280/728.2 |
| 5,613,701 | A | | 3/1997 | Bentley et al. |
| 5,630,613 | A | | 5/1997 | Leonard et al. |
| 5,662,351 | A | * | 9/1997 | Phillion et al. ......... 280/728.3 |
| 5,676,394 | A | | 10/1997 | Maly |
| 5,722,684 | A | | 3/1998 | Saderholm et al. |
| 5,727,812 | A | | 3/1998 | Dykstra et al. |
| 5,738,366 | A | * | 4/1998 | Phillion .............. 280/728.2 |
| 5,752,714 | A | | 5/1998 | Pripps et al. |
| 5,794,967 | A | * | 8/1998 | Manire ............... 280/728.3 |
| 5,803,490 | A | * | 9/1998 | Seventko et al. ........ 280/728.2 |

(List continued on next page.)

FOREIGN PATENT DOCUMENTS

| JP | 5262198 A | * | 10/1993 | ........... B60R/21/20 |
| JP | 5262198 A | * | 10/1993 | ........... B60R/21/20 |

Primary Examiner—Paul N. Dickson
Assistant Examiner—Joselynn Y Sliteris
(74) Attorney, Agent, or Firm—Sally J. Brown; James D. Erickson

(57) ABSTRACT

The present invention provides an airbag cover with controlled movement during deployment of an airbag. The airbag cover includes a panel member configured to cover a compartment housing the airbag apparatus. The airbag cover further includes a breakaway hinge leg connected to the panel member and engaging an anchor device to secure the airbag cover during normal operations. The breakaway hinge leg is further configured with a tear seam which separates the breakaway hinge leg into first and second parts upon inflation of the airbag. The airbag cover further includes a retaining hinge leg connected to the panel member and engaging an anchor device to retain the panel member during normal and accident conditions. The retaining hinge leg is configured with a plurality of energy-management apertures. During deployment of an airbag, the energy-management apertures receive energy from the impact of the airbag with the airbag cover and controls the energy to prevent separation of the retaining hinge leg. The energy-management apertures may be strategically disposed singularly or in a group.

29 Claims, 7 Drawing Sheets

U.S. PATENT DOCUMENTS

| | | |
|---|---|---|
| 5,803,495 A | 9/1998 | Jackson et al. |
| 5,810,390 A | 9/1998 | Enders et al. |
| 5,851,023 A * | 12/1998 | Nagata et al. ............ 280/728.3 |
| 6,039,342 A * | 3/2000 | Sasaki ..................... 280/728.3 |
| 6,179,325 B1 * | 1/2001 | Igawa ..................... 280/728.3 |
| 6,250,669 B1 * | 6/2001 | Ohmiya ................... 280/728.2 |
| 6,273,455 B1 * | 8/2001 | Bohn ...................... 280/728.3 |
| 6,296,270 B1 * | 10/2001 | Amamori ................. 280/728.3 |
| 6,394,486 B1 * | 5/2002 | Fujimura et al. ......... 280/728.2 |

* cited by examiner

ENERGY MANAGED AIRBAG COVER

BACKGROUND OF THE INVENTION

1. Field of the Invention

The present invention relates to airbag inflation apparatuses for use in motor vehicles and, more specifically, to airbag covers for use in storing airbags.

2. Technical Background

Inflatable airbags have become well accepted in their use in motor vehicles and have been attributed with preventing numerous deaths in accidents. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit (ECU) and one airbag module or two. The ECU is usually installed in the middle of an automobile, between the passenger and engine compartment. If the vehicle has a driver bag only, the ECU may be mounted in the steering wheel. The ECU includes a sensor which continuously monitors the acceleration and deceleration of the vehicle and sends this information to a processor which processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to impact a passenger and prevent injury to the passenger. In some airbag apparatuses, the airbag may be fully inflated within 50 thousands of a second and deflated within two tenths of a second.

An airbag cover covers a compartment containing the airbag module and may reside on a steering wheel, dashboard, vehicle door, or vehicle wall. The airbag cover is typically made of a rigid plastic and may be forced opened by the pressure from the deploying airbag. In deploying the airbag, it is preferable to retain the airbag cover to prevent the airbag cover from flying loose in the passenger compartment. If the airbag cover freely moves into the passenger compartment, it may injure a passenger.

Industry is concerned with designing airbag covers in a cost effective manner. Airbag covers which are formed of injection molded parts are economically manufactured and are therefore popular. In one design, the airbag cover is configured with a hinge leg. During deployment the hinge leg retains its engagement to an anchor device to prevent the airbag cover from flying loose into the passenger compartment. A concern, however, is that the hinge leg is made of a rigid plastic material which may tear or otherwise separate during deployment of the airbag.

It would be therefore be an advancement in the art to provide a hinge leg for an airbag cover which better retains the airbag cover during deployment. It would be another advancement in the art to provide a hinge leg with superior resistance to deployment energy. It would be a further advancement in the art to provide an airbag cover with superior resistance while still being composed of an economical material such as plastic. Such a device is disclosed and claimed herein.

BRIEF SUMMARY OF THE INVENTION

The present invention provides an airbag cover with controlled movement during deployment of an airbag. The airbag cover includes a panel member which is configured to cover a compartment housing the airbag apparatus. The panel member may conform to the surrounding surface structure of a dashboard, steering wheel, or other vehicle surface housing the compartment. The airbag cover further includes a breakaway hinge leg connected to the panel member and extending from the panel member in substantially a perpendicular direction. The breakaway hinge leg engages an anchor device to secure the airbag cover during normal operations. The breakaway hinge leg is further configured with a tear seam which separates the breakaway hinge leg into first and second parts upon inflation of the airbag. In this manner, the breakaway hinge leg severs its connection to an anchor upon deployment of an airbag.

The airbag cover further includes a retaining hinge leg connected to the panel member and extending from the panel member in substantially a perpendicular direction. The retaining hinge leg may be disposed parallel to the breakaway hinge leg. The retaining hinge leg is configured to engage an anchor device to retain the panel member during normal and accident conditions.

The retaining hinge leg is further configured with a plurality of energy-management apertures. During deployment of an airbag, the energy-management apertures receive energy from the deploying airbag and control it such that the cover hinge leg remains completely or partially attached to prevent the separation of the retaining hinge leg from the panel member which may result in free movement of the panel member.

An energy-management aperture adjacent or in the path of a tear provides relief by increasing the stretch capability of the retaining hinge leg. An energy-management aperture in an elliptical pattern provides relief by causing the energy to cancel itself out rather than tear through the hinge leg. Thus, the energy-management aperture obstructs the tear and resists further tearing. The energy-management apertures may be disposed singularly or in a group. In some embodiments, apertures are strategically disposed in linear series to provide added resistance to tearing or to increase the likelihood of intercepting a tear.

Conversely, the energy-management apertures can induce tearing in a location so as to prevent tearing elsewhere on the hinge leg. Induced tearing in a hinge leg may prevent complete separation of the cover from the retaining hinge leg during deployment of an airbag.

As airbag covers are made from rigid plastics, the retaining hinge leg is susceptible to tearing during deployment. Energy-management apertures on the retaining hinge leg are an economical and efficient means to reduce airbag cover/door weight while maximizing the stress/strain characteristics of the associated hinge legs.

Airbag covers generally are susceptible to sink marks where a hinge leg thickness exceeds the thickness of a cover. This is termed as the cover to hinge leg sink ratios. Energy-management apertures allow for a thinner hinge leg thickness resulting in improved cover aesthetics.

These and other features, and advantages of the present invention will become more fully apparent from the following description and appended claims, or may be learned by the practice of the invention as set forth hereinafter.

BRIEF DESCRIPTION OF THE SEVERAL VIEWS OF THE DRAWING

In order that the manner in which the advantages and features of the invention are obtained, a more particular description of the invention summarized above will be rendered by reference to the appended drawings. Understanding that these drawings only provide selected embodiments of the invention and are not therefore to be considered limiting of the scope, the invention will be described and explained with additional specificity and detail through the use of the accompanying drawings in which.

DETAILED DESCRIPTION OF THE INVENTION

A preferred embodiment of the invention is now described with reference to the FIGS. 1–7, where like reference numbers indicate identical or functionally similar elements. The components of the present invention, as generally described and illustrated in the Figures, may be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
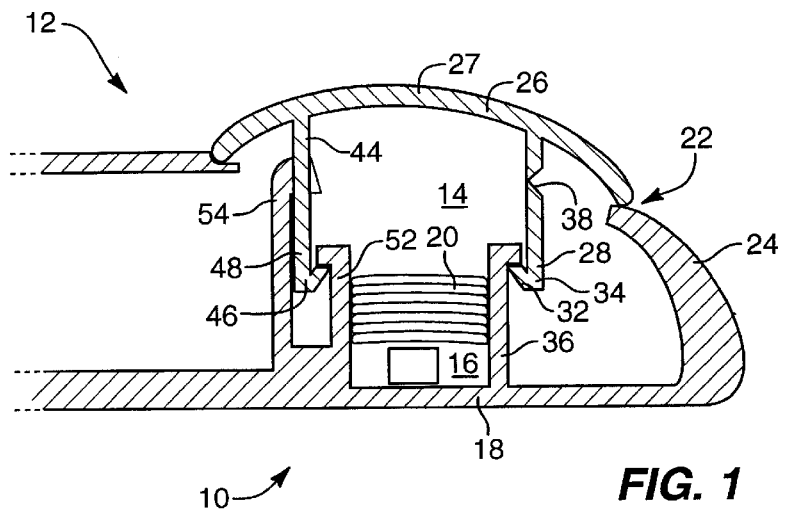
FIG. 1 is a cross sectional view of one embodiment of the airbag cover apparatus of the present invention shown in conjunction with an airbag apparatus having a deflated airbag.
Figure 2:
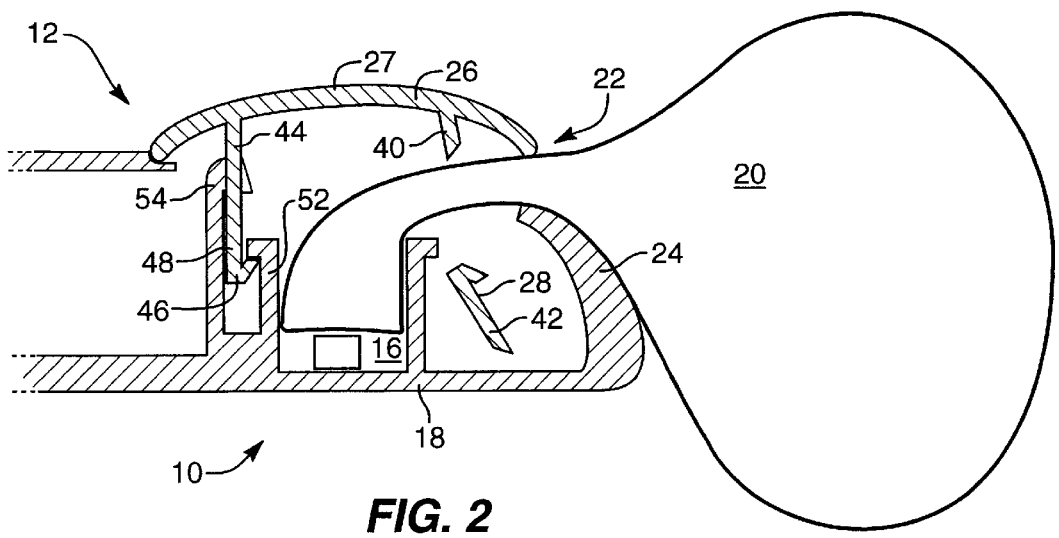
FIG. 2 is a cross sectional view the embodiment of FIG. 1 shown in conjunction with an airbag apparatus having an inflated airbag.

Referring to FIGS. 1 and 2, a cross-sectional view of an airbag apparatus 10 disposed within a dashboard 12 is shown. Although the present invention is shown in conjunction with a dashboard 12 it may also be used with air bag covers for side air bags, inflatable curtains, steering wheels, vehicle doors, vehicle walls, passenger instrument panel integrated, and so forth. The embodiments shown herein for use with a dashboard are for illustrative purposes only and one of skill in the art will appreciate that the present invention may be used with all air bag covers.

The dashboard 12 is installed within the passenger compartment of a vehicle. The dashboard 12 includes a cavity 14 to contain the airbag apparatus 10. The airbag apparatus 10 includes an inflator system 16 secured to the bottom surface 18 of the dashboard 12. The inflator system 16 is in communication with an airbag 20 which is disposed adjacent the inflator system 16.

The dashboard 12 is further configured with an egress aperture 22 which is disposed on an upper surface 24 of the dashboard 12. The egress aperture 22 is covered by an airbag cover 26 which is configured to cover the egress aperture 22 and retain its position until deployment and inflation of the airbag 20. The airbag cover 26 is designed to generally conform to the surrounding surface of the dashboard 12, or other surfaces such as that of a steering wheel and so forth.

In one embodiment, the airbag cover 26 may be formed of a molded plastic material and configured for strength and integrity to prevent complete separation of the panel during inflation of the airbag 20. Airbag covers 26 may be embodied in various configurations, but the objectives are to cover an egress aperture 22, permit deployment and inflation of an airbag 20, and prevent free movement of the airbag cover 26. Thus, an airbag cover 26 must remain secured in its position until deployment of the airbag 20. In accident conditions, the airbag cover 26 must move relative to the egress aperture 22 to permit the immediate deployment and inflation of the airbag 20. The airbag cover 26 includes a panel member 27 configured to substantially cover the egress aperture 22. The panel member 27 further conforms to the contour of the dashboard 12, steering wheel, vehicle door or other structure housing the apparatus 10.

The airbag cover 26 may further include one or more hinge legs or flanges which are used to secure the panel member 27. Airbag covers 26 vary in their configuration and incorporate a variety of embodiments for hinge legs or flanges. Accordingly, one of skill in the art will appreciate that various hinge legs or flanges may be used and are incorporated within the scope of the invention. A hinge leg or flange may further include a foot channel or a hook member to engage an anchor device and secure the airbag cover 26. One of skill in the art will appreciate that there are various members which may be disposed on a hinge leg or a flange in order to secure the hinge leg or flange. These variations on the foot channel or hook member may be incorporated into the present invention and are included within the scope of the invention.

In the embodiment of FIGS. 1 and 2, the airbag cover 26 includes a breakaway hinge leg 28 which is connected to the panel member 27 of the airbag cover 26. The embodiment of FIGS. 1 and 2 is used for illustrative purposes and one of skill in the art will appreciate that a breakaway hinge leg 28 is not a necessary element of the invention. The breakaway hinge leg 28 may be disposed substantially perpendicular to the panel member 27. The breakaway hinge leg 28 serves to retain the airbag cover 26 in a secured position until an accident. As such, the breakaway hinge leg 28 is configured with a foot member 32 on a distal end 34. The foot member 32 engages a first anchor 36 to retain the position of the breakaway hinge leg 28 and the airbag cover 26. The first anchor 36 is secured to the dashboard 12 such as to the bottom surface 18 of the dashboard 12.

The airbag cover 26 may be configured with a tear seam which separates during inflation of the airbag. Separation of the tear seam causes elements of the airbag cover 26 to separate from one another to allow the airbag 20 to exit. One of skill in the art will appreciate that the tear seam may be disposed in various other locations and still be within the scope of the invention. For example, tear seams may be disposed on the airbag cover 26 which are accessible to the passenger compartment. In one embodiment, the tear seam may be disposed on the panel member 27 such that it traverses the latitudinal length of the member 27. During inflation, the airbag 20 impacts the tear seam and breaks the seam. Separation of the tear seam causes the panel member 27 to separate into two members and provides an exit for the airbag 20.

In the embodiment of FIGS. 1 and 2, a tear seam 38 is disposed on the breakaway hinge leg 28. The tear seam 38 traverses the latitudinal length of the breakaway hinge leg 28. During inflation of the airbag 20, the airbag 20 strikes the breakaway hinge leg 28 with sufficient energy and force to break the breakaway hinge leg 28 at the tear seam 38. The tear seam 38 may be configured as a notch opening away from the airbag 20 thereby facilitating the break of the breakaway hinge leg 28 as the airbag strikes the breakaway hinge leg 28.

When the tear seam 38 is broken, the breakaway hinge leg 28 separates into first and second portions 40, 42 and no longer secures the position of the airbag cover 26. The first portion 40 retains its connection with the panel member 27 while the second portion 42 falls within the cavity 14. Thus, in normal operation, neither portion 40, 42 of the breakaway hinge leg 28 enters the passenger compartment of the vehicle. The airbag cover 26 moves in response to the deployment of the airbag 20 and permits egress of the airbag 20 through the egress aperture 22.

The airbag cover 26 further includes a hinge leg or flange configured to engage an anchoring device and retain the position of the panel member 27. As shown in FIGS. 1 and 2, the retaining hinge leg 44 is connected to the panel member 27. One of skill in the art will appreciate that the retaining hinge leg 44 may be configured in a variety of methods, many of which are commonly known in the art. In some embodiments, the airbag cover 26 may have multiple retaining hinge legs 44 for securement. The term retaining hinge leg 44 should therefore be interpreted broadly to include various members which retain or otherwise anchor an airbag cover 26.

In the embodiment of FIGS. 1 and 2, the retaining hinge leg 44 may be disposed perpendicular to the panel member 27 and may be disposed substantially parallel to the breakaway hinge leg 28. The retaining hinge leg 44 is configured to control the movement of the airbag cover 26 and prevent the airbag cover 26 from freely moving about the passenger compartment during deployment of the airbag 20. As can be appreciated, unrestricted movement of the airbag cover 26 may injure passengers.

Similar to the breakaway hinge leg 28, the retaining hinge leg 44 may be configured with a foot member 46 disposed on a distal end 48. In an alternative embodiment, the retaining hinge leg 44 may further be configured with hook or other member for engaging an anchor device as is commonly known in the art.

The foot member 46 engages a second anchor 52 which is secured to the bottom surface 18 of the dashboard 12. The retaining hinge leg 44 maintains its engagement of the foot member 46 with the second anchor 52 to control movement of the airbag cover 26. The retaining hinge leg 44 may further be configured with a clip hole (not shown) which engages a protruding member 54. Such engagement is described in further detail below. The engagement of the retaining hinge member 44 with the second anchor 52 and the protruding member 54 allows for controlled pivotal movement of the airbag cover 26. During airbag deployment, the pivotal movement of the airbag cover 26 allows for the egress of the airbag 20. The airbag 20 is thus allowed to impact and protect a passenger 56.

Figure 3:
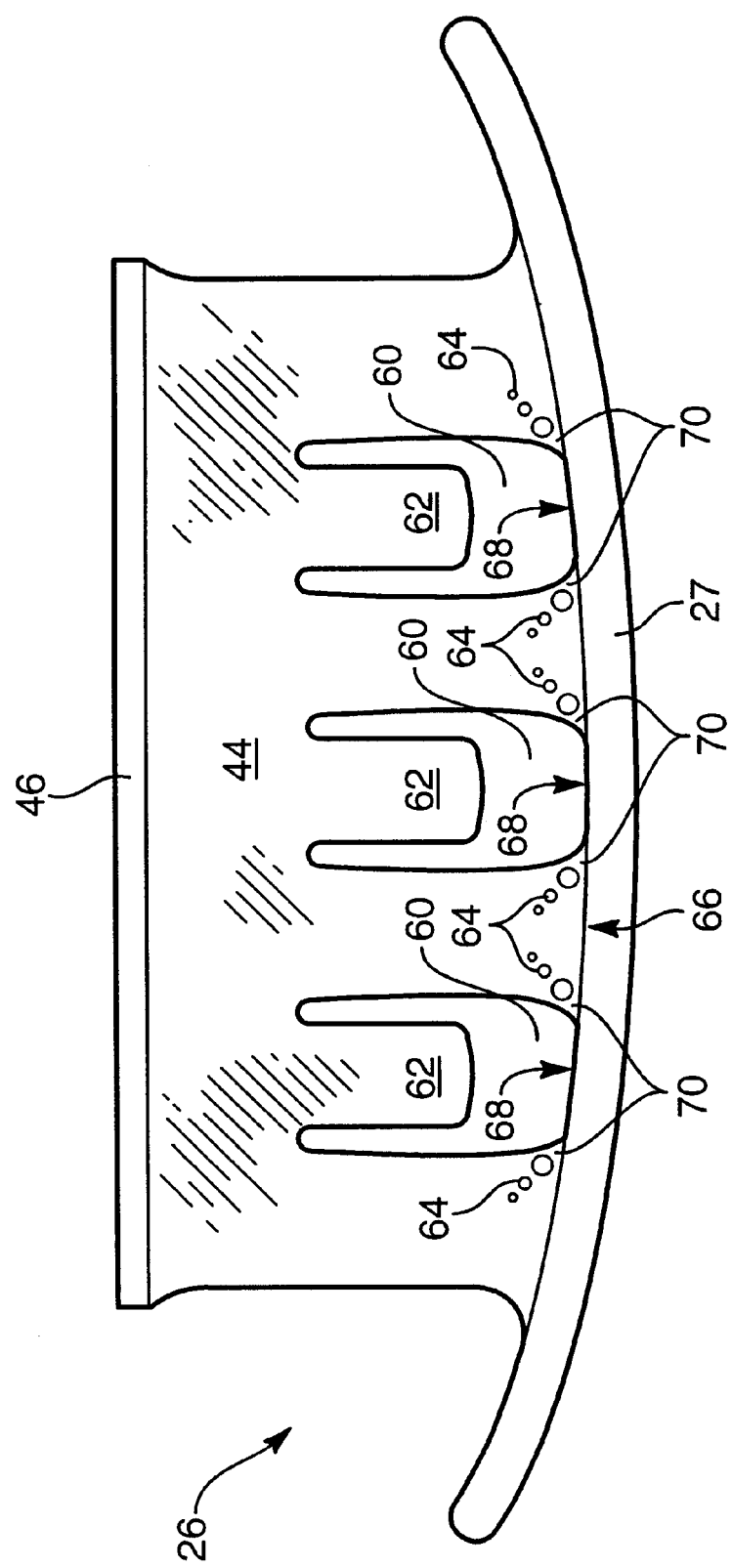
FIG. 3 is a plan view of one embodiment of the airbag cover of the present invention.

Referring to FIG. 3, a plan view of the airbag cover 26 is shown from a view illustrating the retaining hinge leg 44. The retaining hinge leg 44 is configured with clip holes 60 which, in one embodiment, are substantially rectangular in configuration. The retaining hinge leg 44 further includes clip springs 62 with each clip spring 62 extending into a corresponding clip hole 60. In operation, each clip hole 60 receives a protruding member 54. Each clip spring 62 moves in response to the insertion of the protruding member 54. The frictional engagement of the protruding member 54 with the clip spring 62 assists in retaining the protruding member 54. When the airbag 20 is deployed, the clip springs 62 allow for some pivotal movement of the retaining hinge leg 44 relative to the protruding member 54. In this manner, the airbag cover 26 is retained as it moves to accommodate the deployment of the airbag 20.

The retaining hinge leg 44 further includes energy-management apertures 64 which may be disposed in a variety of configurations. The energy-management apertures 64 serve to control and redirect the energy from the connection 66 of the retaining hinge leg 44 and the panel member 27. The energy is generated by the inflator system 16 in deploying the airbag 20 and includes stress and torsional movement resulting from the impact of the airbag 20. Although the airbag 20 is designed to strike the breakaway hinge leg 28, the airbag 20 still impacts the retaining hinge leg 44 with substantial force. The energy-management apertures 64 receive energy from the impact and control the energy. This energy may proceed in various directions around the perimeter of the apertures 64. This results in the material of the retaining hinge leg 44 stretching in various directions rather than tearing in a single direction. As such, the energy tends to cancel itself out rather than tear through the retaining hinge leg 44. The disposition of an energy-management aperture 64 adjacent to a tear or in the path of a tear increases the stretch capability of the retaining hinge leg 44 and thereby resists tearing.

The energy-management apertures 64 may be strategically disposed singularly or grouped together. In one embodiment, the energy-management apertures 64 may be disposed in a linear series. One of skill in the art will appreciate that other embodiments for grouping the energy-management apertures 64 are possible and are included within the scope of the invention.

In controlling energy from the general area of the connection 66, the connection 66 is less likely to break or otherwise separate. In some instances, the connection 66 may partially or completely separate. Complete separation of the of connection 66 results in free movement of the airbag cover 26 in the passenger compartment which may result in injury to passengers.

As shown in FIG. 3, the energy-management apertures 64 may be disposed adjacent the connection 66 and may be configured in a row or line. A series of energy-management apertures 64 may provide increased stretch capability and added resistance to tearing as they are more likely to intercept a tear. The energy-management apertures 64 may further be disposed adjacent a base 68 of the clip holes 60. The base 68 of the clip hole 60 is defined as the area of the clip hole 60 adjacent the connection 66. The apertures 64 may be configured in a row which extends from an area adjacent the connection 66 and the base 68. The apertures 64 may further be oriented at a certain angle as it extends from an area adjacent the connection 66 and the base 68. The energy-management apertures 64 may be circular in configuration as shown in FIG. 3. The apertures 64 may further decrease in diameter size as the apertures 64 extend from the connection 66.

The retaining hinge leg 44 may further be configured with a pair of radii 70 at the base 68 of each clip hole 60. The radii 70 provide a rounded corner rather than a sharp corner that would otherwise exist with a generally rectangular clip hole 60. The radii 70 increase material stretch capability or added resistance to tearing and further support the connection 66 of the panel member 27 to the retaining hinge leg 44. The radii 70 may extend into the clip hole 60, as shown in FIG. 3, or may also extend away from the clip hole 60. In either embodiment, the radii 70 provide a rounded corner which increases stretch capability and resistance to tearing.

Figure 4:
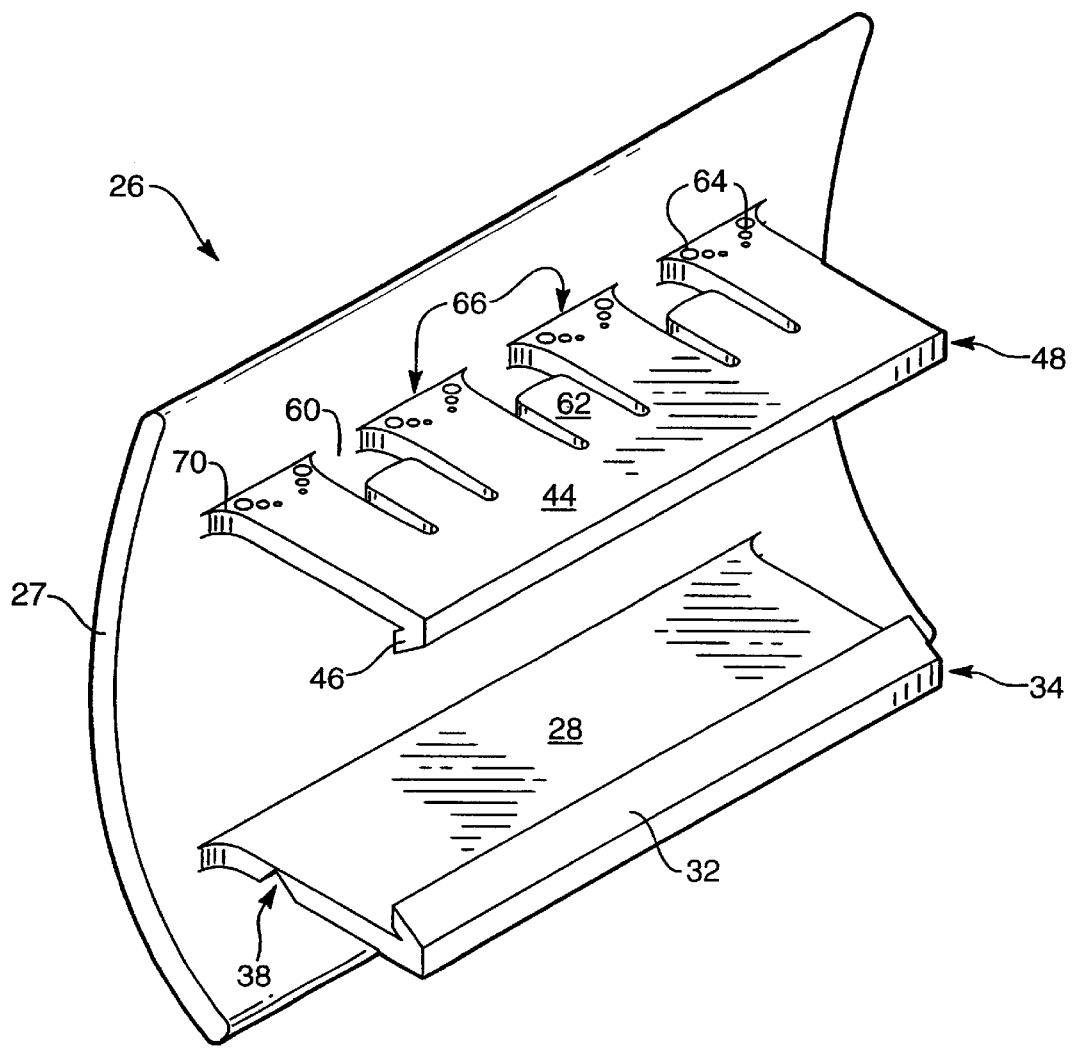
FIG. 4 is a perspective view of the embodiment of FIG. 3 of the airbag cover of the present invention.

Referring to FIG. 4, a perspective view of the embodiment of the airbag cover 26 is shown which illustrates the disposition of the retaining hinge leg 44 relative to the breakaway hinge leg 28. The retaining hinge leg 44 is disposed substantially parallel to the breakaway hinge leg 28. The tear seam 38 traverses substantially along the latitudinal length of the breakaway hinge leg 28.

Figure 5:
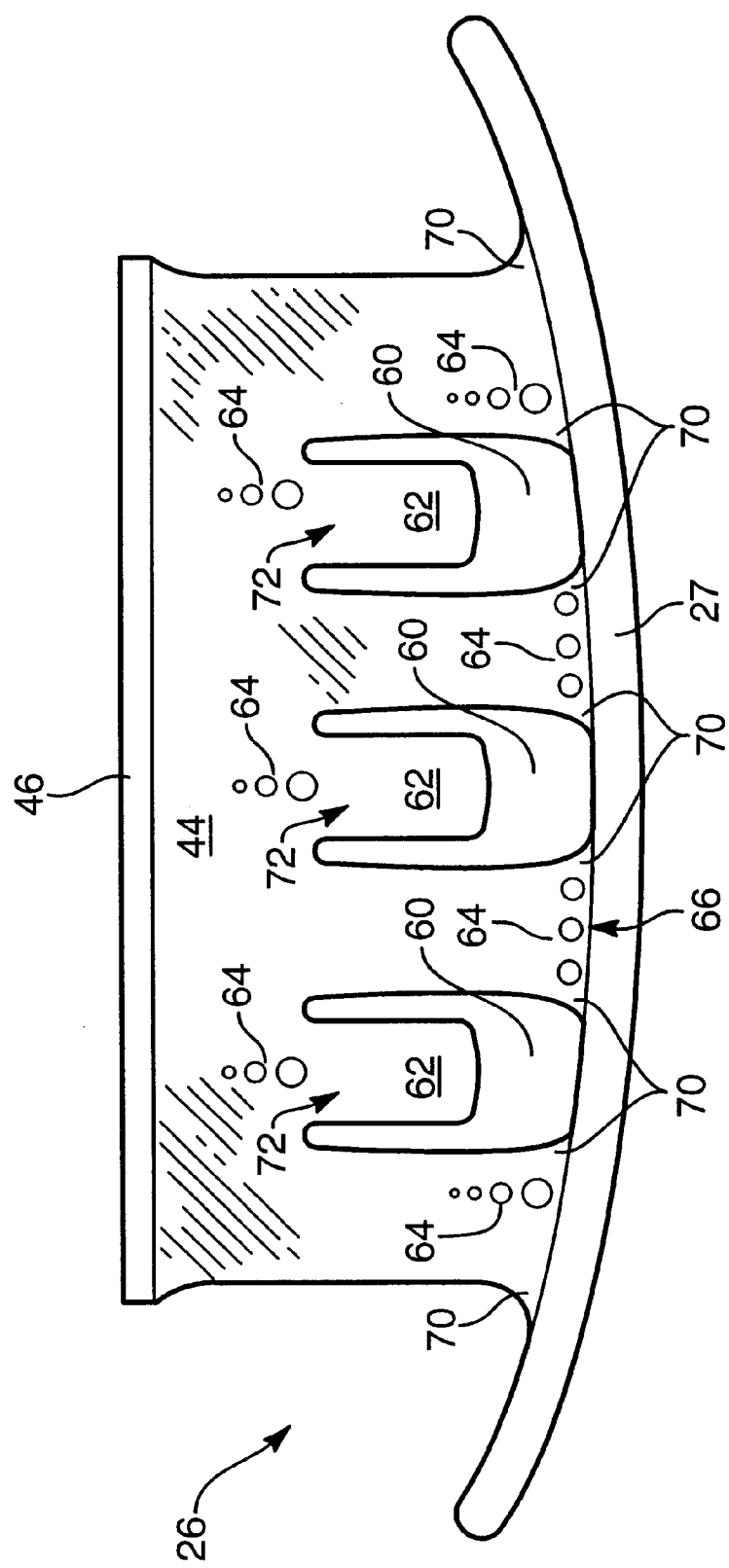
FIG. 5 is a plan view of an alternative embodiment of the airbag cover of the present invention.

Referring to FIG. 5, a plan view of an alternative embodiment of the airbag cover 26 is shown. In the illustrated embodiment, the energy-management apertures 64 are shown disposed in alternative configurations for illustrative purposes. For example, the energy-management apertures 64 may be disposed in a row parallel to the connection 66 between the panel member 27 and the retaining hinge leg 44. When disposed in a row parallel to the connection 66 the apertures 64 need not necessarily progress or regress in size. The energy-management apertures 64 may also be disposed perpendicular to the connection 66. Although the illustrated energy-management apertures 64 are configured in a row, a single energy-management aperture 64 may also be disposed adjacent the connection 66. Disposition of energy-management apertures 64 are a matter of design choice and one of skill in the art will appreciate that the apertures 64 may be disposed in a variety of configurations and still be included within the scope of the invention.

In one embodiment, energy-management apertures 64 may further be disposed adjacent the distal end 48 or adjacent the remote end 72 of the clip holes 60. Energy-management apertures 64 disposed at such locations may assist in the direction of energy from the connection 66.

Figure 6:
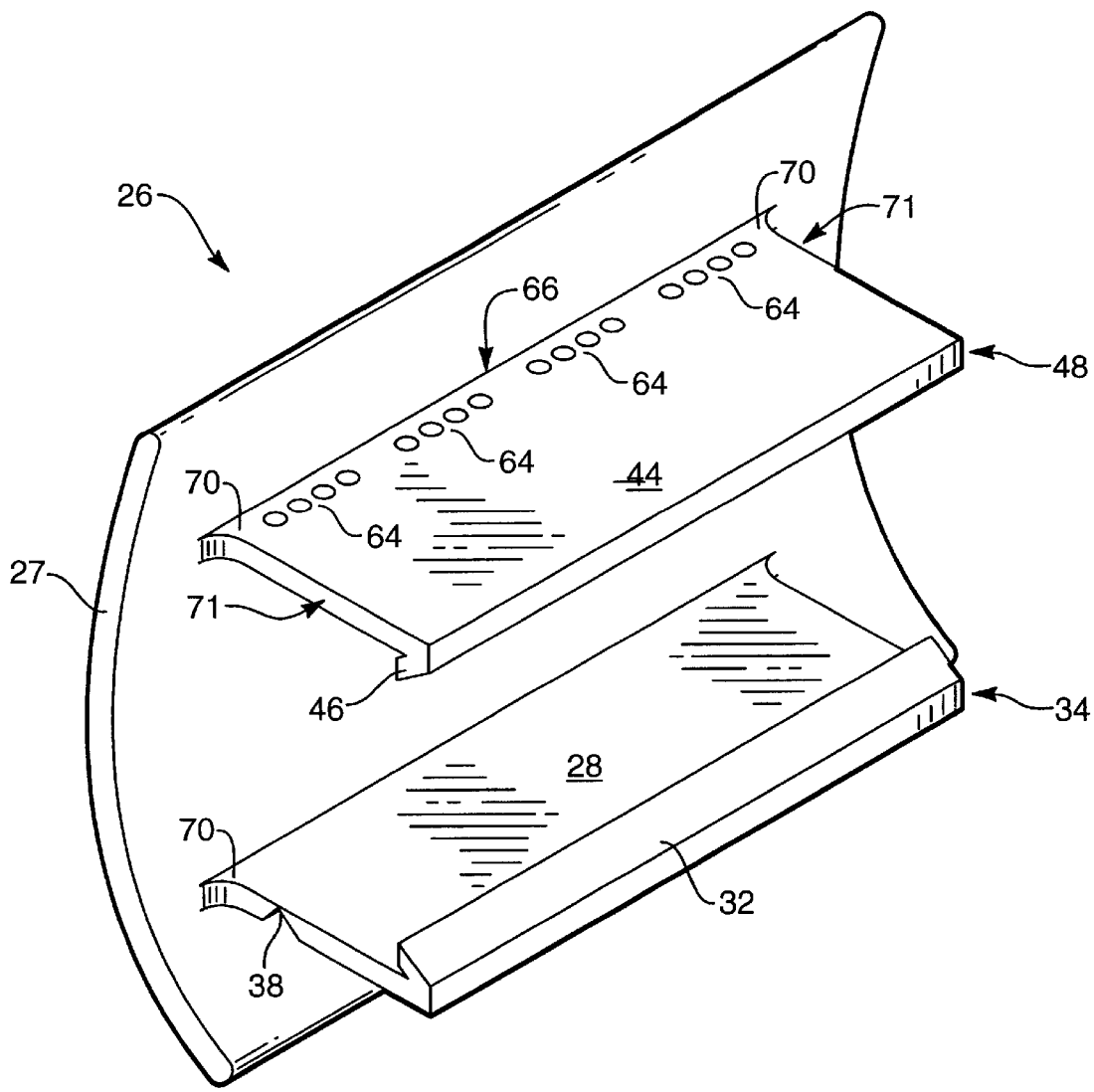
FIG. 6 is a perspective view of an alternative embodiment of the airbag cover of the present invention.

Referring to FIG. 6, there is shown a perspective view of an alternative embodiment of the airbag cover 26. In the illustrated embodiment, the retaining hinge leg 44 is not configured with clip holes 60 or clip springs 62. The retaining hinge leg 44 may be secured to the dashboard 12 through the engagement of the foot member 46 with the second anchor 52 exclusively or through alternative methods. The retaining hinge leg 44 may still be configured with energy-management apertures 64 which may be disposed in a row parallel to the connection 66, perpendicular to the connection 66, or at an angle relative to the connection 66. The energy-management apertures 64 may also be disposed singularly such that they are not in a row or line. The energy-management apertures 64 may also be disposed in groups which are non-linear. One of skill in the art will appreciate that variations on the configurations of the energy-management apertures 64 based on design choice are included within the scope of the invention. The energy-management apertures 64 serve in the same manner to control and redirect energy away from the connection 66 to reduce the likelihood of severance of the connection 66.

The retaining hinge leg 44 may further be configured with radii 70 to increase stretch and tear resistance in the connection 66. The radii 70 are disposed at the latitudinal ends 71 of the retaining hinge leg 44. The breakaway hinge leg 28 may also be configured with radii 70 to increase stretch and resist tearing.

Figure 7A:
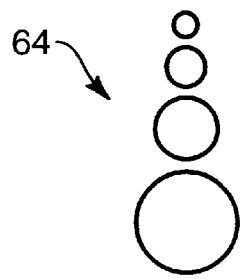
FIGS. 7A–7D are plan views of various alternative energy-management apertures of the present invention.

Referring to FIGS. 7A–7D, various shape configurations for the energy-management apertures 64 are shown. In FIG. 7A, the apertures 64 are configured in a circular shape and are disposed in a row. A circular shape includes elliptical and oblong shapes as well. As the row extends, the apertures 64 decrease in size. Thus, when the row of apertures 64 is disposed to extend from the connection 66, radii 70, or the remote end 72 of the clip hole 60 the apertures 64 become progressively smaller. This embodiment has been previously illustrated in FIGS. 3 and 4.

Figure 7B:
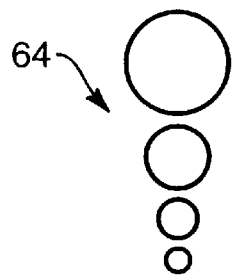

In FIG. 7B, the energy-management apertures 64 are also configured in a circular shape. However, the apertures 64 increase in size as they extend from a certain area, such as the connection 66.

Figure 7C:
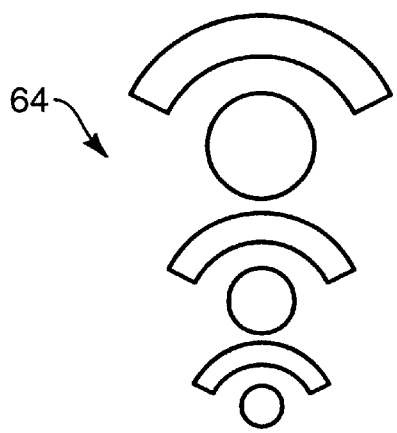

In FIG. 7C, the energy-management apertures 64 are configured in a row of alternating circular and rib shapes. This variation on aperture configuration is deemed to have a different effect on energy redirection. Similar, to FIG. 7B, as the row of apertures 64 extends from a certain area, the apertures 64 increase in size.

Figure 7D:
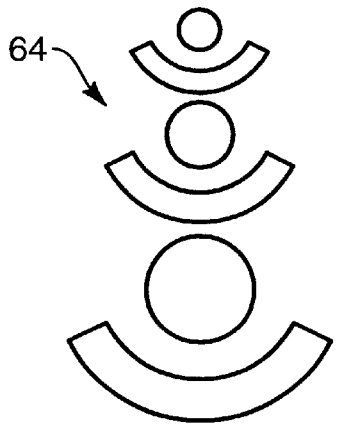

In FIG. 7D, the energy-management apertures 64 are configured in a row of alternating circular and rib shapes. As with FIG. 7A, the row of apertures 64 decreases in size as the apertures extend from a certain area.

The illustration of energy-management apertures 64 shown in FIGS. 7A–7D are for illustrative purposes only as one of skill in the art will appreciate that the apertures 64 may be disposed in a variety of configurations and still be included within the scope of the invention. For example, the apertures 64 may also be configured in crescent or diamond shapes. The apertures 64 may also be disposed singularly or in a non-linear group rather than being arranged in a row or line. The apertures 64 may also remain equivalent sizes as they progress in a row.

Figure 8:
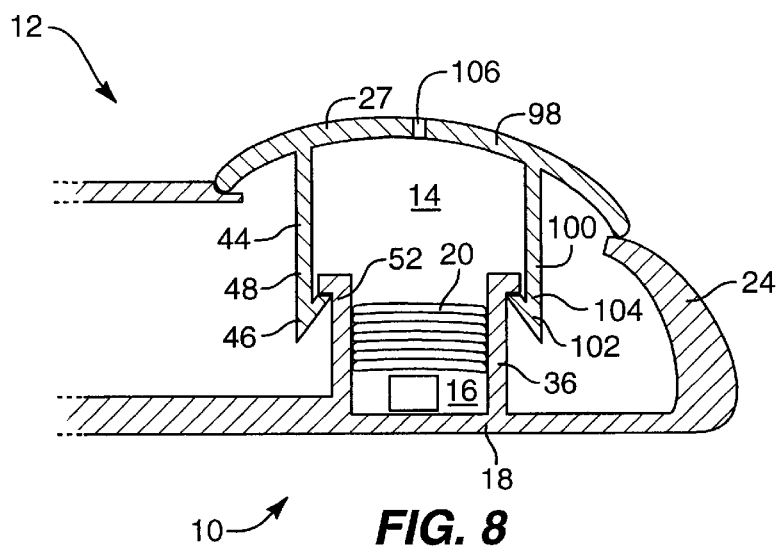
FIG. 8 is a cross sectional view of an alternative embodiment of the airbag cover apparatus of the present invention shown in conjunction with an airbag apparatus having a deflated airbag.
Figure 9:
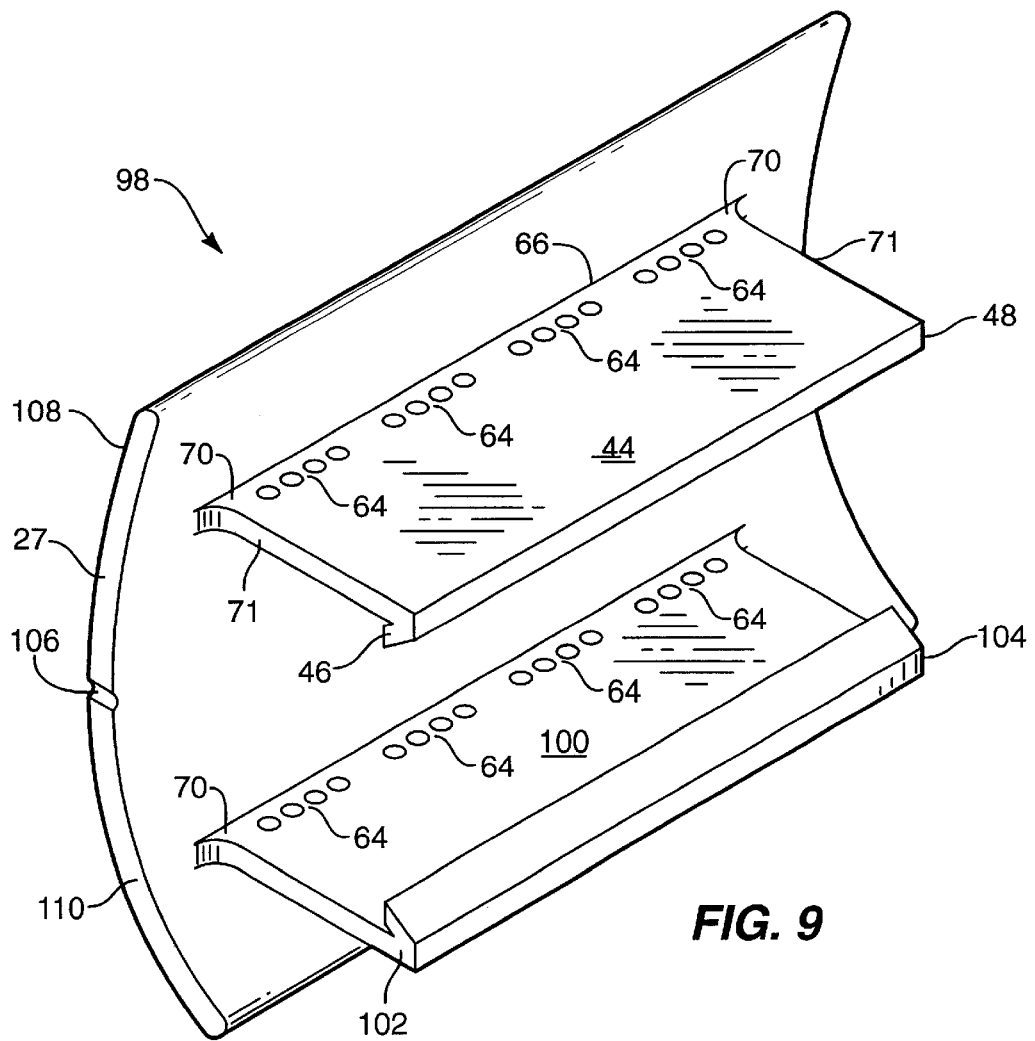
FIG. 9 is a perspective view of the airbag cover of the embodiment of FIG. 8.

Referring to FIGS. 8 and 9, an alternative embodiment of the airbag cover 98 is shown. The embodiments of FIGS. 8 and 9 illustrate that the energy-management apertures 64 of the present invention may be used with various airbag covers. The airbag cover 98 includes a retaining hinge leg 44 that is disposed perpendicular to the panel member 27. As in the embodiments disclosed above, the retaining hinge leg 44 is configured to control the movement of the airbag cover 98 and prevent the airbag cover 98 from freely moving about the passenger compartment during deployment of the airbag 20.

The retaining hinge leg 44 may be configured with a foot member 46 disposed on a distal end 48. In an alternative embodiment, the retaining hinge leg 44 may further be configured with hook or other member for engaging an anchor device as is commonly known in the art. The foot member 46 engages an anchor 52 which is secured to the bottom surface 18 of the dashboard 12. One of skill in the art will appreciate that there are various ways of securing a retaining hinge leg 44 to secure surface and are included within the scope of the invention. The airbag cover 98 may further include a second retaining hinge leg 100 similar in configuration to the retaining hinge leg 44. The second retaining hinge leg 100 may be configured with a foot member 102 disposed on a distal end 104. Unlike the breakaway hinge leg 28 of the prior embodiments, the second retaining hinge leg 100 does not have a tear seam.

The airbag 98 may include a tear seam 106 which, in one embodiment, laterally traverses the panel member 27. During airbag 20 deployment, the airbag 20 impacts the panel member 27 and the tear seam 106 to separate the panel member 27 into first and second parts 108, 110. The airbag 20 then exits from the cavity 14 between the first and second parts 108, 110. The retaining hinge legs 44, 100 may pivot to allow for the egress of the airbag 20, but otherwise remain anchored to prevent free movement of the airbag cover 98.

The retaining hinge legs 44, 100 may be configured with energy-management apertures 64 which may be embodied as any of the previous embodiments, including circular and rib configurations. The apertures 64 may also be disposed in a row parallel to the connection 66, perpendicular to the connection 66, or at an angle relative to the connection 66. The energy-management apertures 64 may also be disposed singularly or in non-linear groups. One of skill in the art will appreciate that variations on the configurations of the energy-management apertures 64 based on design choice are included within the scope of the invention. The energy-management apertures 64 serve in the same manner to control and redirect energy away from the connection 66 to reduce the likelihood of severance of the connection 66.

The retaining hinge legs 44, 100 may further be configured with radii 70 to increase stretch and tear resistance in the connection 66. The radii 70 are disposed at the latitudinal ends 71 of the retaining hinge leg 44.

The present invention provides an airbag cover 26 with a retaining hinge leg 44 with energy-management apertures 64 for resisting tears during deployment of the airbag 20. Energy-management apertures 64 on the retaining hinge leg 44 are an economical and efficient means for increasing the stretch capability in materials and thereby resist tears. The energy-management apertures 64 receive energy and redirect the energy to prevent a tear through the retaining hinge leg 44. The energy-management apertures 64 may be disposed singularly or in a group to increase stretch capability, resist tearing, and intercept potential tears. Clip holes 60 may further be configured with radii to provide rounded corners and reduce the likelihood of tearing.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An airbag cover apparatus which is restricted in movement during inflation of an airbag, comprising:
    a panel member;
    a retaining hinge leg connected to the panel member and having a proximal end and a distal end, said retaining hinge leg being connected to the panel member at the proximal end, said retaining hinge leg configured to engage an anchor at the distal end; and
    a plurality of energy-management apertures disposed in said retaining hinge leg at a position generally adjacent the proximal end such that the energy management apertures control and redirect energy from the proximal end of the retaining hinge leg.

2. The airbag cover apparatus of claim 1 further comprising a breakaway hinge leg connected to the panel member and having, a tear seam configured to separate the breakaway hinge leg into first and second parts upon inflation of an airbag.

3. The airbag cover apparatus of claim 2, wherein the retaining hinge leg is disposed substantially parallel to the breakaway hinge leg.

4. The airbag cover apparatus of claim 1, wherein the energy-management apertures comprise circular and rib apertures.

5. The airbag cover apparatus of claim 4, wherein the circular and rib apertures are disposed in a row extending from the proximal end and alternate between circular apertures and rib apertures.

6. The airbag cover apparatus of claim 5, wherein the circular and rib apertures decrease in size as the apertures extend from the proximal end.

7. The airbag cover apparatus of claim 5, wherein the circular and rib apertures increase in size as the apertures extend from the proximal end.

8. The airbag cover apparatus of claim 1, wherein the energy-management apertures comprise circular apertures disposed in a row extending from the proximal end and decreasing in diameter as the apertures extend from the proximal end.

9. The airbag cover apparatus of claim 1, wherein the energy-management apertures comprise circular apertures disposed in a row extending from the proximal end and increasing in diameter as the apertures extend from the proximal end.

10. The airbag cover apparatus of claim 1, further comprising energy-management apertures disposed proximal to the distal end of the retaining hinge leg.

11. An airbag cover apparatus which is restricted in movement during inflation of an airbag, comprising:
    a panel member;
    a breakaway hinge leg connected to the panel member at a proximal end and having,
        a tear seam configured to separate the breakaway hinge leg into first and second parts upon inflation of an airbag,
        a distal end configured to engage an anchor; and
    a retaining hinge leg connected to the panel member at a proximal end and having,
        a distal end to engage an anchor,
        a plurality of energy-management apertures disposed adjacent the proximal end such that the energy management apertures control and redirect energy from the proximal end of the retaining hinge leg.

12. The airbag cover apparatus of claim 11 further comprising a clip hole disposed adjacent the proximal end of said retaining hinge leg, and a clip member extending into the clip hole, the clip hole and clip member configured to engage a protruding member.

13. The airbag cover apparatus of claim 12, wherein the energy-management apertures comprise circular and rib apertures.

14. The airbag cover apparatus of claim 13, wherein the circular and rib apertures are disposed in a row extending from the proximal end and the clip hole, the circular and rib apertures alternating between circular apertures and rib apertures.

15. The airbag cover apparatus of claim 14, wherein the circular and rib apertures decrease in size as the apertures extend from the proximal end and the clip hole.

16. The airbag cover apparatus of claim 14, wherein the circular and rib apertures increase in size as the apertures extend from the proximal end and the clip hole.

17. The airbag cover apparatus of claim 12, wherein the energy-management apertures comprise circular apertures disposed in a row extending from the proximal end and the clip hole, the circular apertures increasing in diameter as the apertures extend from the proximal end and the clip hole.

18. The airbag cover apparatus of claim 12 further comprising a plurality of clip holes and a plurality of clip members extending into each corresponding clip hole, the energy-management apertures disposed adjacent the proximal end and adjacent to each clip hole.

19. The airbag cover apparatus of claim 11, wherein the retaining hinge leg is disposed substantially parallel to the breakaway hinge leg.

20. The airbag cover apparatus of claim 11, further comprising energy-management apertures disposed proximal to the distal end of the retaining hinge leg.

21. The airbag cover apparatus of claim 11, further comprising a clip hole disposed adjacent the proximal end of said retaining hinge leg.

22. The airbag cover apparatus of claim 21, wherein the energy-management apertures comprise circular apertures disposed in a row extending from the proximal end and the clip hole, the circular apertures decreasing in diameter as the apertures extend from the proximal end and the clip hole.

23. The airbag cover apparatus of claim 21, wherein the clip hole is substantially rectangular and is further configured to form a radius at the proximal end.

24. An airbag cover apparatus which is restricted in movement during inflation of an airbag, comprising:
   a panel member having a tear seam configured to separate the panel member into first and second parts upon inflation of an airbag; and
   a first retaining hinge leg connected to the panel member at a proximal end and having,
      a distal end configured to engage an anchor, and
      a plurality of energy-management apertures disposed adjacent the proximal end such that the energy management apertures control and redirect energy from the proximal end of the retaining hinge leg.

25. The airbag cover apparatus of claim 24 further comprising a second retaining hinge leg connected to the panel member at a proximal end and having,
   a distal end configured to engage a second anchor, and
   a plurality of energy-management apertures disposed adjacent the proximal end and configured to control energy released during the inflation of an airbag, wherein the first retaining hinge leg is connected to the first part of the panel member and the second retaining hinge leg is connected to the second part of the panel member.

26. The airbag cover apparatus of claim 25, wherein the energy-management apertures comprise circular apertures disposed in a row extending along the proximal end of the first and second retaining hinge legs.

27. The airbag cover apparatus of claim 25, wherein the energy-management apertures comprise circular and rib apertures.

28. The airbag cover apparatus of claim 25, wherein the circular and rib apertures are disposed in a row extending from the proximal end, the circular and rib apertures alternating between circular apertures and rib apertures.

29. An airbag cover apparatus which is restricted in movement during inflation of an airbag, comprising:
   a panel member;
   a retaining leg connected to the panel member and having a proximal end and a distal end, said retaining leg being connected to the panel member at the proximal end, said retaining leg configured to engage anchor at the distal end; and
   a plurality of energy-management apertures disposed in said retaining leg at a position generally adjacent the proximal end such that the energy management apertures control and redirect energy from the proximal end of the retraining leg and control tearing of the retaining leg.

* * * * *